Aug. 10, 1948.  L. CHANAL  2,446,526
FEED CONTROLLER FOR RECORD ENGRAVER
CARRYING CARRIAGES
Filed Oct. 27, 1942

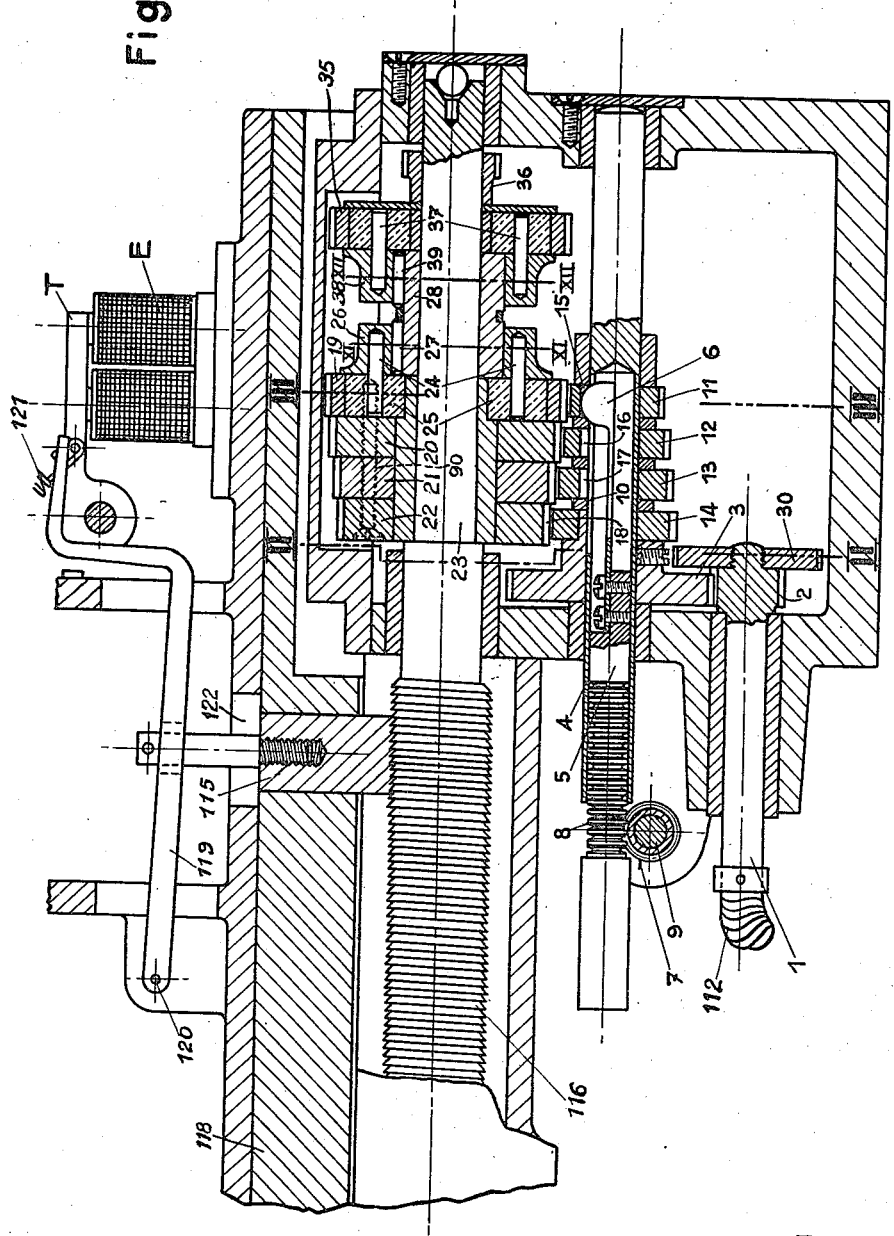

INVENTOR
Lucien Chanal,
BY
*William Hertzroff*
ATTORNEYS.

Aug. 10, 1948.  L. CHANAL  2,446,526
FEED CONTROLLER FOR RECORD ENGRAVER
CARRYING CARRIAGES
Filed Oct. 27, 1942  5 Sheets-Sheet 3

INVENTOR
Lucien Chanal,
BY
ATTORNEYS.

Aug. 10, 1948.  L. CHANAL  2,446,526
FEED CONTROLLER FOR RECORD ENGRAVER
CARRYING CARRIAGES
Filed Oct. 27, 1942 5 Sheets-Sheet 4

INVENTOR
Lucien Chanal,
BY
ATTORNEYS.

Aug. 10, 1948.                    L. CHANAL                    2,446,526
                    FEED CONTROLLER FOR RECORD ENGRAVER
                              CARRYING CARRIAGES
Filed Oct. 27, 1942                                    5 Sheets-Sheet 5
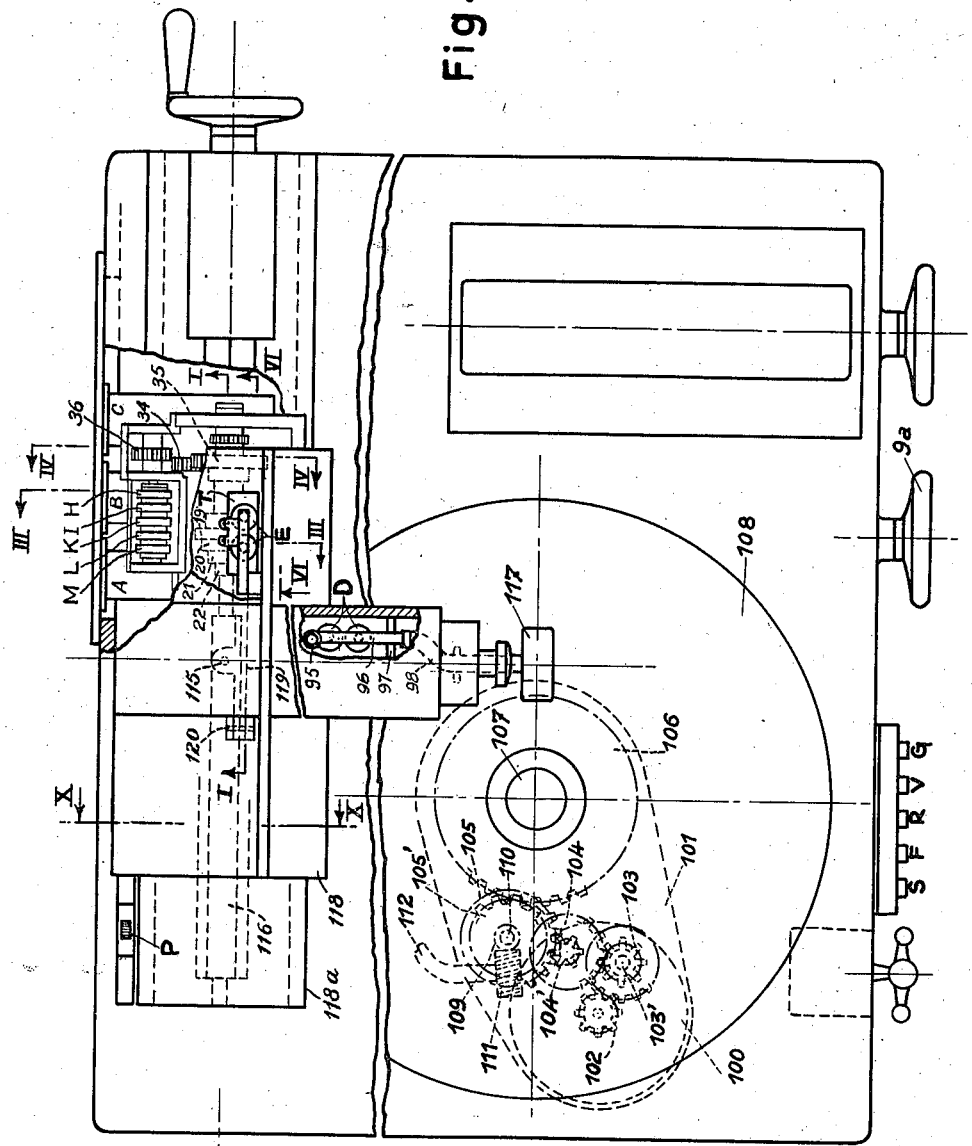
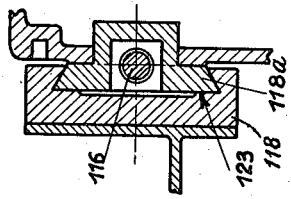
INVENTOR
Lucien Chanal,
BY
ATTORNEYS.

Patented Aug. 10, 1948

2,446,526

UNITED STATES PATENT OFFICE 2,446,526

FEED CONTROLLER FOR RECORD ENGRAVER CARRYING CARRIAGES

Lucien Chanal, Annecy, France; vested in the Attorney General of the United States Application October 27, 1942, Serial No. 463,571
In Switzerland November 8, 1941

8 Claims. (Cl. 274—13)

This invention relates to an improved feed controller for record engraver-carrying carriages adapted to fulfil the requirements laid down for the mechanical registration of sound tracks on records and to satisfy the most up-to-date needs so far as automatism and safety factors are concerned in modern record broadcasting technique.

It may be recalled that for practical broadcasting purposes, a machine should be adapted to receive records having a diameter equal to forty centimeters and should revolve at speeds of 78 and 33⅓ R. P. M. Moreover, several different pitches on the spiral furrow must be utilisable depending upon the length of the record and the characteristics of the material of which it is made. Furthermore, as common recordings often exceed the registration capacity of one face of the record and all emitting stations now use the so-called differential system for record reading, means must be provided to enable an index furrow spaced from the other furrows to be produced during registration. Such index furrow is obtained by momentarily increasing the tool carriage feed and is generally called synchronization furrow. As the registration draws to its close, the last furrow should be moved off previous furrows and should be closed up so that while the pick up device continues to be guided, it cannot sweep the center of the record and produce an undue rattle.

Registering machines have already been proposed to enable these manipulations to be effected manually but they obviously call for special skill on the part of the operator who must therefore have been trained therefor during a considerable time. Moreover, no matter how skilful the operator may be, accuracy of movements is limited by precision in human reflexes and which depends upon the physical condition of the operator. Apart from that, as synchronization must be properly indexed on both operating machines, the latter must be simultaneously accessible to the operator, thereby considerably curtailing the possible arrangements of the appliances in a registering studio.

An object of the present invention is to provide a new or improved feed controller for record engraver-carrying carriages used in sound track registering machines obviating the foregoing disadvantages and furnishing all freedom for the selection of sites or locations ascribed to the machines.

Another object of the invention is to provide an improved controller as aforesaid wherein the means ensuring the feeding or traversing motion of the record engraver-carrying carriage is actuated through a pair of free wheel devices operated in turn from the record carrier drive, one of said devices being associated with a primary gear such as a change speed gear while the other device is associated with a secondary gear adapted for a quicker feed and capable of being temporarily set into rotation selectively through a clutch, the operation of said clutch being controllable from a distance to suit requirements throughout the recording process.

A further object of the invention is to provide an improved controller as aforesaid wherein the whole cycle of motions required for the formation of an index or synchronization furrow as well as the motion required for closing up the furrow at the end of the record are automatically controlled, thereby obviating any manual handling which would require special skill and any risk of a record being damaged by unclever manipulation on the part of a clumsy operator.

A still further object of the invention is to provide an improved controller as aforesaid incorporating safety means so that where the operator inadvertently forgets to switch off the motor when the sound track or furrow reaches the central region of the record being registered, the carriage feeder holding solenoid is automatically switched off and the engraver is brought to inoperative position.

With these and such other objects in view as will incidentally appear hereafter, the invention comprises the novel construction, combination and arrangement of parts that will now be described with reference to the accompanying diagrammatic drawings showing a convenient embodiment of the same and forming a part of the present disclosure.

In the drawings:

Figure 1 is a longitudinal fragmentary detail sectional view of the carriage feed mechanism and the change speed gearing therefor, said view being taken on the line I—I of Figures 2 and 9 looking in the direction of the arrows;

Figure 8 is a wiring diagram showing the electrical connections for the clutch actuator.

Figure 9 is a top plan view of the entire apparatus, assuming certain parts to be broken away for the sake of clearness.

Figure 10 is a fragmentary sectional view on the line X—X of Fig. 9 looking in the direction of the arrows.

Figure 13 is a fragmentary view of the engraver and an electro-magnetic means for controlling the lifting of the same off the record.

Like reference characters designate like parts throughout the several views.

Figure 11:
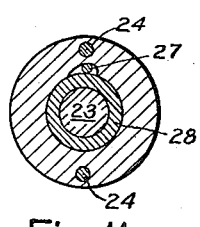
Figures 11 and 12 are detail sectional views on the lines XI—XI and XII—XII of Figure 1, respectively, showing the wedging feathers connecting the actuating gear to the record feed.

As illustrated in Fig. 9, a motor 100 is secured to the casing 101 of a train of gears 102, 103, 104, 105 adapted to transmit the impulse from said motor to a toothed wheel 106 fast on a shaft 107 supporting a record-carrying platform 108. Constructional details of the drive are fully set forth in my co-pending application Serial No. 463,572, filed Oct. 27, 1942, now abandoned, and will not be described in detail in the present specification.

The record-carrying platform 108 is operatively connected with a worm 109 through gear 105 secured to the axis 110. An annular worm wheel 111 meshing with said worm communicates the motion of the platform 108 to a change speed gear through a flexible shaft 112 having its end fixed to a stub shaft 1. The transmission ratio is so reckoned as to cause the shaft 1 to revolve at the same angular speed as the platform 108. The shaft 1 has rigidly secured thereto a pinion 2 meshing with a spur wheel 3 rigidly fixed to a spindle 4 which is hollow over a portion of its length to accommodate a plunger 5 carrying a transmitting finger 6. The axial movements of said plunger are derived from an annular worm wheel 7 meshing with a worm 8 rigidly carried by the plunger 5. The worm wheel 7 is fast upon a shaft 9 fitted with a manually operated pitch-varying hand wheel 9ª (Fig. 9). The transmitting finger 6 projects sidewise from the tubular spindle 4 through a port 10 therein. Opposite said port are provided for idle rotation four pinions 11, 12, 13, 14 respectively formed with grooves 15, 16, 17, 18 adapted selectively to receive the upper portion of the transmitting finger 6 which projects through the port 10. Finger 6 is mounted at its left end on plunger 5 and is resilient so that when the plunger is moved axially the end of finger 6 may be pushed back into spindle 4 by the spacers between gears 11, 12, 13 and 14. Thus finger 6 is disengaged from one gear and moves past the spacer and thence projects again through port 10 for engagement in the groove in the next gear. Each of the pinions 11, 12, 13, 14 forming the "primary gear" meshes with one of four spur wheels 19, 20, 21, 22 loosely mounted for idle rotation on a spindle 23 and interconnected by countersunk dowels 90 (shown in broken lines). The four spur wheels 19, 20, 21, 22 drive the shaft 23 through a cushioning unit comprising dowels 24 tightly fitted in plastic material blocks 25 housed in corresponding recesses in the spur wheel 19. Such dowels engage into a free wheel ring 26 which drives the shaft 23 through wedging feathers 27 and a bushing 28 fast upon said shaft. Such feathers enable the shaft 23 to be driven by the free wheel ring 26 while preventing the same from being driven by the shaft 23.

Figure 2:
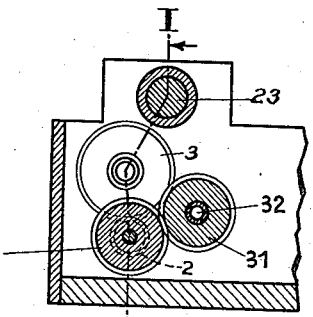
Figure 2 is a fragmentary sectional view on the line II—II of Figure 1, certain of the parts being omitted and showing the general arrangement of shafts 1, 5, 23 and 32.
Figure 12:
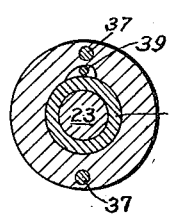
Figure 3:
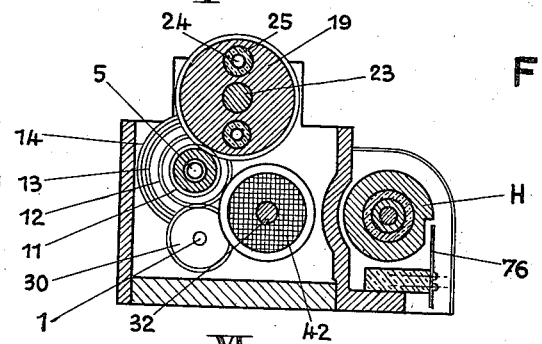
Figure 3 is a view similar to Figure 2 taken on the line III—III of Figure 1 showing in addition a section of the switch drum H.
Figure 4:
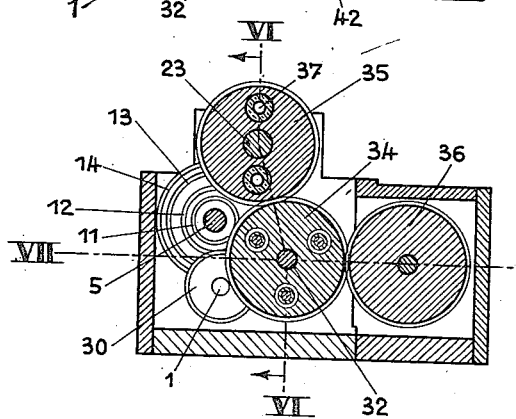
Figure 4 is a sectional view on the line IV—IV of Figure 6 looking in the direction of the arrows.
Figure 5:
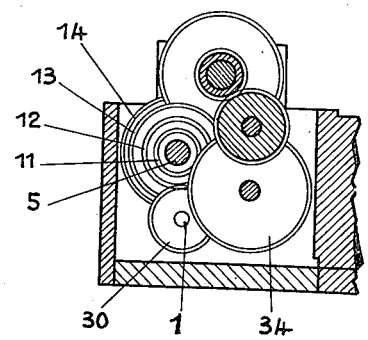
Figure 5 is a sectional view on the line V—V of Figure 6 looking in the direction of the arrows.

As shown in Figs. 1 and 2, the end of the shaft 1 has keyed thereto a pinion 30 meshing with a companion pinion 31 fast upon a pin 32 which, through a magnetic clutch, drives a spur wheel 34 meshing with a pinion 35 and a gear 36 (hereafter called the "secondary gear"). Pinion 35 loosely mounted on the shaft 23 drives the latter through cushioning means comprising dowels 37 having a tight fit in plastic material blocks housed in recesses in the pinion 35. Such dowels 37 are in engagement with a free wheel ring 38. The drive of the shaft 23 takes place owing to the welding effect of feathers 39 on the bushing 28 rigid upon said shaft 23. Such feathers 39 are so arranged that the pinion 35 can drive the shaft 23 when both elements of the clutch 33 are in inter-engagement and that, conversely, the pinion 35 cannot be driven by the shaft 23.

Figure 6:
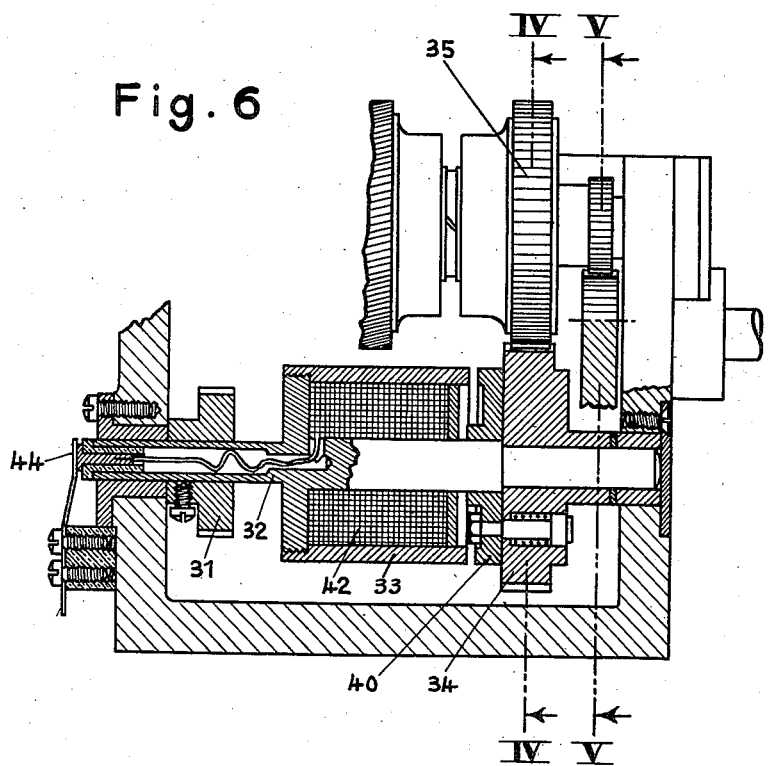
Figure 6 is a fragmentary sectional view on the zigzag line VI—VI of Figure 4 and line VI—VI of Figure 9, the upper gears being shown in elevation.

As shown in Fig. 6, the above-stated magnetic clutch is made up of two parts, one of which (40) turns with the spur wheel 34, while the other one (33) is rigid with the pin 32 operated by the stub shaft 1 through gears 30 and 31. An electromagnet having its winding 42 coiled around the pin 32 controls the axial movement of part 40. When winding 42 is deenergized part 40 is held in the position shown by springs, one of which is shown, nested in recesses in gear 34. Upon the energization of coil 42, part 40 is slid to the left along pin 32 into engagement with the end of the clutch part 33, with the result that the clutch is engaged and the gear 34 is driven with pin 32. Said winding 42 is fed by an auxiliary source of electricity (not shown) and has one of its terminals earthed and its other terminal connected to a contact blade 44 bearing against the end of the pin 32.

Figure 7:
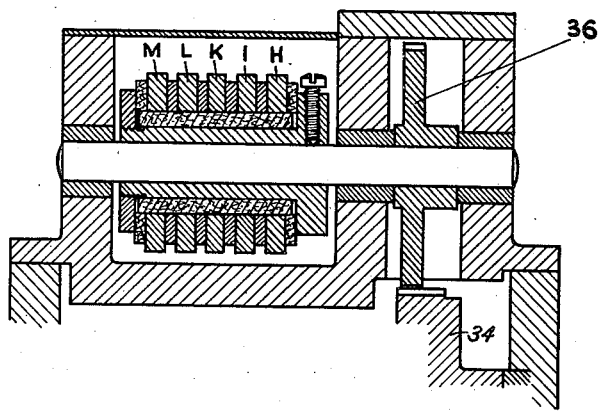
Figure 7 is a horizontal sectional view through a series of drum switches and taken on the line VII—VII of Figure 4.

The driving device for controlling the feed of the carriage 118 and the movements of the sound track engraver 117 comprises the following elements:

1. Electric switches H, I, K, L, M (Fig. 7) mutually interconnected electrically speaking and fitted on a common shaft operatively connected to the movable element 33 of the clutch and consequently to the carriage feeding worm.

2. A relay A of the telephone type.

3. A pair of relays B, C of the telephone type having wiper contacts.

4. Control switches S, F, G, V, R.

5. A pair of electromagnets E, D (see also Fig. 9) adapted to respectively hold in operative position a nut 115 engaging a feed worm 116 which controls the motions of the carriage 118 and an engraver 117; the latter is described in detail in my co-pending application Serial No. 463,573, filed October 27, 1942.

6. A limit switch P for the carriage.

7. A pair of safety switches U, T.

8. An auxiliary source of electric current (not shown) tapped at $n$ and $m$ (Fig. 8).

As shown, the relay A has a winding $a$ and a twin blade reversing switch 45, 46 whose blades respectively come into contact either with contacts 50, 49 or else with contacts 48, 47 depending upon whether the winding is energized or deenergized.

Likewise, the relay B has a winding $b$ and a reversing switch comprising three blades 51, 52, 53 which respectively come into contact either with contacts 58, 57, 59 or else with contacts 55, 54, 56 depending upon whether the winding $b$ of the relay is energized or deenergized.

Likewise again, the relay C has a pair of windings $c^1$, $c^2$ and a reversing switch including a pair of blades 60, 61 which respectively come into contact either with contacts 62, 63 or else with contacts 64, 65 depending upon whether the windings are energized or deenergized.

The revoluble switches are each constituted by a wiper contact 76, 77, 78, 79, 80 and a cam 66, 67, 68, 69, 70 made of an insulating material covered over a portion of its periphery by a metal blade 71, 72, 73, 74, 75. All metal blades 71 to 75 inclusive are electrically connected to each other and thence by the wiper contact 80 through the blade 75 to one pole ($n$) of an auxiliary source of electricity.

The switch U is a two position single switch. It comprises a blade 81 electrically connected to the electromagnet D, and a contact stud 82 electrically connected to said auxiliary source by being properly earthed.

The switch T is a two position two pole switch. It comprises a pair of blades 83, 84 and a pair of contacts 85, 86. Said switch T is controlled by the double electromagnet E which simultaneously actuates the nut 115 through the medium of a lever 119 pivoted at 120 upon the adjacent part of the carriage and subjected to the action of a spring 121 which tends to remove the nut 115 from the worm 116. The nut 115 controls the feed of the carriage 118 to which the engraver 117 is secured. To that effect, the dove-tail portion of carriage 118 projects through a port 122 in the carriage, and is slidably received in a groove 123 formed in the machine frame 118a. It will be seen that the nut 115 is removed from the worm 116 by the spring 121 as soon as the electromagnet E ceases to be energized, said spring simultaneously opening the switch T.

The switch U is controlled in a similar way.

As will be understood from the foregoing, both switches T, U are manually closed while they are automatically opened by means of a mechanically operating device when the electromagnets D, E are respectively deenergized, such as by the springs 84' and 81' shown in Figure 8.

The control switches S, F, R, V, C comprise press buttons among which those referenced by S, F and R are for closing purposes while those referenced by V, G are for opening purposes.

The operation of the entire device takes place as follows and will be set forth under successive headings:

Starting of device

The motor 100 which is adapted to actuate the record-carrying platform 108 is first switched on. Then shortly before the outset of the sound track registration, the safety switch T is manually closed. This energizes the double electromagnet E (through $n$, 51, V, P, 83, 85 and $m$) and enables the nut 115 on the carriage 118 to be brought into engagement with the feed worm 116. As the registration begins, the safety switch U is closed and the engraver 117 is laid upon the record (not shown) carried by the platform 108. As the electromagnet D is then energized through $n$, T, 86, 60, G, 81, 82 and $m$, it holds down the engraver 117 in operative position, whereupon the registration of the sound track takes place normally.

It will be seen that owing to the provision of the safety switches T, U, it is quite impossible to perform an unskilful manipulation when starting a sound track registration and to scratch or otherwise hurt the record. Thus for example the engraver cannot be laid upon the record if the carriage nut is not in engagement with the worm.

Making of index or synchronization grooves or furrows

When the operator wants an indexing groove or synchronizing furrow to be produced, it is only sufficient for him to operate the press button S to close the circuit. The closure of the circuit energizes the winding 42 of the magnetic clutch 33 (through $n$, S, 45, 48, 54, 52, 44 and $m$) whose elements are thus interwedged. From now on, the stub shaft 1 drives the shaft 23 through the pinions 30, 31, the spur wheels 34, 35, the elastic coupling 36, 37, the free wheel ring 38 and the feathers 39 which then come into wedging relation with the bushing 28 which, as aforesaid, is rigid with the shaft 23. These pinions and spur wheels are so provided that the shaft 23 should revolve about four times faster than when it is actuated by the pinions 11, 12, 13, 14. As a result of this, the engraver-carrying carriage is also fed four times faster and the resultant furrow or sound track also has a higher pitch.

As the spur wheel 34 meshes with the gear 36, the revoluble switches H, I, K, L, M are rotatably driven. The pinions 31, 30, 34, 36 are so selected as to cause the rotary speed of the switches to be equal to that of the record-carrying platform 108, whereby to one full revolution of said platform corresponds a full revolution of the switches H, I, K, L, M.

Shortly after the beginning of this rotary motion, the wiper contact 78 of the switch K rides over the cam blade 73. As said blade is connected to the source of electrical current via the switch K and as the wiper contact 78 is connected to the contact 54, the switch shunts the press button S. This results in the magnetic clutch remaining engaged even if the operator releases the button S. Then as the rotation of the switches continues, the wiper contact 79 of the switch I rides over the cam blade 74. The latter is connected to the source of current through the switch H, while the wiper contact 79 is connected to one end of the winding $a$ of the relay A whose other end is directly connected to said source by proper earthing. Therefore the relay A is energized and actuates the two pole switch 45, 46. From that moment on, the press button S is connected via the blade 45 to the contact 59 which is connected to the wiper contact 79 and is accordingly switched off. Consequently the clutch remains energized until the switches resume their inoperative position. This takes place after a full revolution of the latter. In fact, after a full revolution of the switches K, I, the wiper contacts 78, 79 respectively move off their cam blade 73, 74 so that the relay A is deenergized as well as the winding 42 of the magnetic clutch. At that moment, the whole device comes to a standstill in the original position, the clutch being disengaged and the shaft 23 is again operated through the pinions 11, 12, 13, 14 forming the primary or change speed gear. As the switches H, J, K, L, M revolve at the same speed as the record-carrying platform 108, it will be found that the engraver has cut only one synchronization furrow of higher pitch.

Where it is desired to produce two synchronization furrows one after the other, it is only sufficient to press the button R shortly after reaching the end of the first furrow and to hold it in this position during a fraction of revolution of the platform, i. e. during a short period of time just sufficient to enable the wiper contact 78 to again come into engagement with the metal blade 73.

*End of record registration*

The end of the record registration is controlled by operating the press button F to close the circuit. When pressing upon the button F, the winding $b$ of the relay B and the winding $c^1$ of the relay C which are connected in parallel are energized through the blade 46 and the contact 47 of the relay A. The relay B is then positioned with its armature engaging the core of the relay coil or "stuck" and operates the three pole reversing switch 51, 52, 53 while the relay C operates the two pole reversing switch 60, 61. Consequently the wiper contact 77 of the revoluble switch L is connected to the contact 47 via the contacts 59 and 53. As said wiper 77 is in contact with the cam blade 72 and as this blade is connected with the source of current, through the switch K, the press button F is shunted by the switch L. Therefore the operator can release the button F without any risk. Moreover, the blade 52 is now in contact with the contact 57 so that the winding 42 of the clutch is directly fed. The clutch being operative, an increased pitch furrow is cut in the record, as above stated, while the switches are set into revolution. Furthermore, the carriage nut holding electromagnet E which was fed via 55, 51, V and P is now fed via H, 71, 76, 58, 51, V and P but as the relay B has a wiping contact no interruption of current takes place at E. As the relay C is now "stuck," the winding $c^1$ is fed through the contacts 61 and 65 while the engraver holding electromagnet D which was fed through the contacts 60 and 62 is now fed through the contact 60.

It will be noticed that as the relays B and C belong to the wiper contact type, all the reverses occur without break in current feed so that the electromagnets E and D constantly remain energized. Consequently the engraver remains applied on the record and the carriage continues its motion.

After slightly less than a revolution of the switches, the wiper contact 76 moves off the cam blade 71 so that the switch M cuts off the current feed to the electromagnet E. Under the influence of the spring 121, the carriage nut is then disengaged from the worm and opens the safety switch T. The engraver carriage is thus brought to a standstill and henceforward the engraver cuts a circumference into the record. The wiper contact 77 of the switch L moves off the cam blade 72 and cuts off the winding $b$ of the relay B. The three pole reversing switch then resumes its original position but the winding 42 of the magnetic clutch is still fed through the wiper contact 78 and the cam blade 73 which at that time are already in mutual contact. However, the current feed to the winding $c^1$ of the relay C is cut off but the relay C remains "stuck" since its winding $c^2$ is connected in parallel upon the clutch winding 42 beyond the switch K.

After a second full revolution of the switches, the wiper contact 78 moves off the cam blade 73 and cuts off the current from the clutch winding 42 and also from the electromagnet D connected in parallel thereto. The whole switch assembly H, I, K, L, M is arrested in the original position, and as the electromagnet D is no longer energized it allows a lifting back motion of the engraver under the influence of its return spring 95 and thus opens the safety switch U. In Figure 13 is shown the magnet D which when energized holds down the armature 96 against the action of the spring 95. Armature 96 when released by the magnet D turns in a counter-clockwise direction about its pivot 97 and its inner end tilts the pivoted engraver support 98 in a clockwise direction, thereby lifting the engraver 117 from the record. A closed furrow is then defined and the engraver is lifted off.

It will be seen that the whole cycle of motions which is necessary for the formation or cutting of a synchronization furrow and of a record end furrow is automatically controlled. Therefore there is no need to exercise any manual skill or special tricks to bring about such motions while any risk of a record being detrimentally affected by lack of skill on the part of the operator is precluded. Furthermore, the two machines which require to be synchronized may not be simultaneously located within easy reach of the operator.

Where, moreover, the operator forgets to perform control for the record end, it will be seen in Fig. 9 that as soon as the carriage reaches the center of the record it energizes switch P and causes the switch P to be opened. Said switch cuts off the current which was feeding the electromagnet E that held the carriage nut so that the carriage is brought to a standstill. Disengagement of the carriage nut opens the safety switch T which cuts off the electromagnet D which so far held the engraver. The latter is then lifted and opens the safety switch U.

Where this is required, the press button G permits the engraver to be lifted off the record in the course of a sound track registering process without requiring stoppage of the carriage while the press button V connected in series with the switch P permits the carriage feed to be stopped and the engraver to be lifted off the record at each desired moment.

Minor constructional details might be altered in the general structure of the device without sacrificing its advantages or departing from the scope of the subjoined claims.

What is claimed is:

1. A sound track registering machine, having a controller for the feeder of the carriage carrying the engraver for the record, supported on a rotating platform, driving means common and operatively connected to both, said platform and said feeder, characterized in that the controller is automatically operable and comprises in combination, a pair of free wheel devices adapted to be driven by said driving means and selectively connected to said carriage feeder, a primary gear for coupling said driving means to said feeder through one of said free wheel devices, a secondary gear for coupling said driving means to the feeder through the other free wheel device, the two gears having a different gearing ratio, a clutch associated with the gears, and means for operating the clutch and changing over the drive from one gear to the other to vary the feed rate.

2. A sound track registering machine, having a controller for the feeder of the carriage carrying the engraver for the record, supported on a rotating platform, driving means common and operatively connected to both said platform and said feeder, characterized in that the controller is automatically operable and comprises in combination, a pair of free wheel devices adapted to be driven by said driving means and selectively connected to said carriage feeder, a primary gear including differently sized pinions for coupling said driving means to the feeder through one of said free wheel devices, a secondary gear for coupling said driving means to the feeder through the other free wheel device, the secondary gear having a ratio higher than any of the primary gear pinions, a clutch associated with the gears, and means for operating the clutch and changing over the drive from one gear to the other so as to vary the feed rate.

3. A sound track registering machine, having a controller for the feeder of the carriage carrying the engraver for the record, supported on a rotating platform, driving means common and operatively connected to both, said platform and said feeder, characterized in that the controller is automatically operable and comprises in combination, a pair of free wheel devices adapted to be driven by said driving means and selectively connected to said carriage feeder, a change speed gear for coupling said driving means to the feeder through one of said free wheel devices, a high ratio gear for coupling said driving means to the feeder through the other free wheel device, a magnetic clutch associated with the gears, manually operable control means for setting the change speed gear, and electrical switch and relay means for the remote control of the clutch and the change over of the drive from one gear to the other so as to alter the rate of feed.

4. A sound track registering machine, having a controller for the feeder of the carriage carrying the engraver for the record, supported on a rotating platform, driving means common and operatively connected to both said platform and said feeder, characterized in that the controller is automatically operable and comprises in combination, a pair of free wheel devices adapted to be driven by said driving means and selectively connected to said carriage feeder, a change speed gear for coupling said driving means with different gearing ratios to the feeder through one of said free wheel devices, a high ratio gear for coupling said driving means to the feeder through the other free wheel device, a magnetic clutch associated with the gears, manually operable control means for setting the change speed gear, electrical switch and relay means for the remote control of the clutch and the change over of the drive from one gear to the other so as to alter the rate of feed, electromagnetic means operating the engraver carriage feeder, and switch means for energizing said electromagnetic means during different periods for the generation of index grooves and end grooves on records.

5. A sound track registering machine, having a controller for the feeder of the carriage carrying the engraver for the record, supported on a rotating platform, driving means common and operatively connected to both, said platform and said feeder, characterized in that the controller is automatically operable and comprises in combination, a pair of free wheel devices adapted to be driven by said driving means and selectively connected to said carriage feeder, a change speed gear for coupling said driving means with different gearing ratios to the feeder through one of said free wheel devices, a high ratio gear for coupling said driving means to the feeder through the other free wheel device, a magnetic clutch associated with the gears, manually operable control means for setting the change speed gear, electrical switch and relay means for the remote control of the clutch and the change over of the drive from one gear to the other so as to alter the rate of feed, electromagnetic means holding down the engraver carriage feeder in operative condition, switch means for energizing said electromagnetic means during different periods, and safety means for automatically lifting the engraver off the record on completion of the sound track registration.

6. A sound track registering machine, having a controller for the feeder of the carriage carrying the engraver for the record, supported on a rotating platform, driving means common and operatively connected to both, said platform and said feeder, characterized in that the controller is automatically operable and comprises in combination, a pair of free wheel devices adapted to be driven by said driving means and selectively connected to said carriage feeder, a change speed gear for coupling said driving means with different gearing ratios to the feeder through one of said free wheel devices, a high ratio gear for coupling said driving means to the feeder through the other free wheel device, a magnetic clutch associated with the gears, manually operable control means for setting the change speed gear, electrical switch and relay means for the remote control of the clutch and the change over of the drive from one gear to the other so as to alter the rate of feed, electromagnetic means holding down the engraver carriage feeder in operative condition, switch means for energizing said electromagnetic means during different periods, safety means for automatically lifting the engraver off the record on completion of the sound track registration, and further safety means co-related with the carriage feeder and said electromagnetic means to disengage the engraver from the record responsive to hindrances against suitable registration.

7. A sound track registering machine, having a controller for the feeder of the carriage carrying the engraver for the record, supported on a rotating platform, driving means common and operatively connected to both, said platform and said feeder, characterized in that the controller is automatically operable and comprises in combination, a pair of free wheel devices adapted to be driven by said driving means and selectively connected to said carriage feeder, a change speed gear for coupling said driving means with different gearing ratios to the feeder through one of said free wheel devices, a high ratio gear for coupling said driving means to the feeder through the other free wheel device, a magnetic clutch associated with the gears, manually operable control means for setting the change speed gear, electrical switch and relay means for the remote control of the clutch and the change over of the drive from one gear to the other so as to alter the rate of carriage feed, electromagnetic means holding down the engraver carriage feeder in operative condition, switch means for energizing said electromagnetic means during different periods, safety means for automatically lifting the engraver off the record on completion of the sound track registration, and further safety means co-related with the carriage feeder and electromagnetic means to disengage the engraver from the record responsive to hindrances against suitable registration, said last-named safety means including a switch connected across said electromagnetic means and operated by disengagement of said carriage from said carriage feeder.

8. A sound track registering machine, having a controller for the feeder of the carriage carrying the engraver for the record, supported on a rotating platform, driving means common and operatively connected to both, said platform and said feeder, characterized in that the controller is automatically operable and comprises in combination, a pair of free wheel units operating the worm, a primary gear including a line of differently sized pinions girdling said shaft, intermeshing pinions loose on a spindle having a manually shiftable transmitter selectively engageable with the last-named pinions to change the gearing ratio, a secondary gear adjacent the other free wheel ring having a gearing ratio higher than that of any of the primary gear pinions, said rings being secured to elastic members in recesses of the adjacent pinions, a magnetic clutch associated with the gears, and electrical switch and relay means permitting remote control of the clutch and change over of the drive from one gear to the other so as to alter the rate of engraver carriage feed by said feeder.

LUCIEN CHANAL.

REFERENCES CITED

The following references are of record in the file of this patent:

UNITED STATES PATENTS

| Number | Name | Date |
| --- | --- | --- |
| 1,451,722 | Valentine | Apr. 17, 1923 |
| 1,485,236 | Merkel | Feb. 26, 1924 |
| 1,564,767 | Eggart | Dec. 8, 1925 |
| 2,170,159 | Ridgway | Aug. 22, 1939 |
| 2,174,167 | Rattray | Sept. 26, 1939 |
| 2,198,102 | Armitage | Apr. 23, 1940 |
| 2,262,732 | Gruber | Nov. 11, 1941 |
| 2,270,310 | Kelley | Jan. 20, 1942 |
| 2,293,190 | Brubaker | Aug. 18, 1942 |